United States Patent
Kilgore et al.

(10) Patent No.: US 7,446,316 B2
(45) Date of Patent: Nov. 4, 2008

(54) SKIN DETECTION SENSOR

(75) Inventors: George A. Kilgore, Edina, MN (US); P. Rand Whillock, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 380 days.

(21) Appl. No.: 11/264,654

(22) Filed: Oct. 31, 2005

(65) Prior Publication Data

US 2007/0106160 A1    May 10, 2007

(51) Int. Cl.
*A61B 6/00* (2006.01)
(52) U.S. Cl. .................. 250/339.11; 250/341.8
(58) Field of Classification Search ............ 250/339.11, 250/341.8
See application file for complete search history.

(56) References Cited

U.S. PATENT DOCUMENTS

| | | | |
|---|---|---|---|
| 4,500,784 A | 2/1985 | Hacskaylo | |
| 5,737,439 A | 4/1998 | Lapsley | |
| 5,739,534 A * | 4/1998 | Estenson et al. | ....... 250/339.11 |
| 6,292,576 B1 | 9/2001 | Brownlee | |
| 6,600,946 B1 * | 7/2003 | Rice | ............ 600/473 |
| 2003/0053664 A1 | 3/2003 | Pavlidis et al. | |

FOREIGN PATENT DOCUMENTS

| | | |
|---|---|---|
| EP | 1 353 292 A1 | 10/2003 |
| JP | 2005190 | 5/1998 |
| JP | 200020684 | 6/2006 |
| WO | WO 01/27882 A2 | 4/2001 |

OTHER PUBLICATIONS

Jonathan Dowdall et al. Face Detection in the Near-IR Spectrum Image and Vision Computing 21 (2003) 565-578.

* cited by examiner

*Primary Examiner*—Constantine Hannaher
(74) *Attorney, Agent, or Firm*—Kris T. Fredrick

(57) ABSTRACT

A device for detecting the presence of human skin including an illuminator source for providing a first IR band and a second IR band. The first IR band is capable of being reflected from skin and the second IR band is capable of being absorbed by skin. A detector receives the first and second IR band after the bands have contacted the skin and provides a signal indicating the presence or absence of each of the first and second IR bands. A processing unit processes the signal and indicates the presence of skin when the first IR band is present and the second IR band is absent. The preferred first IR band is about 0.8 to about 1.4 μm and the second IR band is about 1.4 to about 2.2 μm. Preferably one illuminator interacts with two detectors, one for each of the two IR bands.

20 Claims, 2 Drawing Sheets

SKIN DETECTION SENSOR

FIELD OF THE INVENTION

The present invention relates to skin detection sensors. More particularly, the invention relates to such sensors where both the IR reflective properties and IR absorbing properties of skin are employed to detect the presence of human skin.

BACKGROUND OF THE INVENTION

The invention may be related to U.S. patent application Ser. No. 10/987,806, filed Nov. 12, 2004, and entitled "Infrared and Visible Fusion Face Recognition System". The invention may also be related to U.S. patent application Ser. No. 10/987,368, filed Nov. 12, 2004, and entitled "Infrared Face Detection and Recognition System". These above-mentioned patent applications are incorporated herein by reference. The assignee of these patent applications is the same assignee of the present invention.

Other related patent documents may include U.S. Pat. No. 6,370,260 B1, issued Apr. 9, 2002, entitled "Near-IR Human Detector", and by Pavlidis et al.; U.S. Pat. No. 6,718,049 B2, issued Apr. 6, 2004, entitled "Near-Infrared Disguise Detection", and by Pavlidis et al.; and U.S. patent application Ser. No. 10/077,672, filed Feb. 15, 2002, entitled "Near-Infrared Method and System for Use in Face Detection", and by Pavlidis et al.; all of which are incorporated herein by reference. The assignee of these patent documents is the same assignee of the present invention.

Current biometric sensors based on measuring fingerprint identity or hand geometry sensors are of significant interest to a variety of industries and applications. The security industry is constantly seeking sensors that identify certain specific persons to allow access to a secured area, a device such as a computer or other electronic equipment, or a cell phone.

However, biometric sensors that rely on a particular property of a person, such as a fingerprint, can be defeated. If a rubber cast or cutout of a fingerprint is used, the device will recognize the correct print, even if it is not being used by the person to whom it belongs. Photographs of irises have been used to thwart iris detection. Thus, access to secure property would be compromised.

Currently there are no devices that prevent synthetic objects to be substituted for human skin in the biometric sensor industries. It would be a great advance in the art if a device could be provided that would accurately identify the presence of human skin in a situation where an individual's specific and unique characteristic could then be recognized.

It would be another advantage in the art if the presence of human skin could be determined before a biometric sensor determines the existence of a specific person.

Yet another advantage would be if a device could be provided that would be simple and inexpensive to manufacture, small in size for incorporation into existing biometric sensors, and easy to use to permit or deny access to the biometric sensor.

Other advantages will appear hereinafter.

SUMMARY OF THE INVENTION

It has now been discovered that the above and other advantages of the present invention may be obtained in the following manner. Specifically, the present invention provides a device for detecting the presence or absence of human skin.

The device includes an illuminator source for providing a first IR band and a second IR band, each of which contributes to the detection scheme. The first IR band is reflected from skin, and particularly human skin, and the band is directed on a path for detection. The second IR band is capable of being absorbed by skin and thus, if skin is present, none or hardly any of the band is reflected. The preferred first IR band is about 0.8 to about 1.4 µm and the second IR band is about 1.4 to about 2.2 µm. Both bands could be transmitted at the same time in this embodiment, as could other bands not of interest in this invention.

A detector is positioned to receive the first and second IR band after the bands have contacted the skin. The detector provides a signal indicating the presence or absence of each of the first and second IR bands. A processing unit processes the signal and indicates the presence of skin when the first IR band is present and the second IR band is absent.

An electronic detection evaluator performs a weighted difference and threshold of the outputs of the detector. If the output voltage is pulled high, this indicates that the first IR band reflected and the second IR band absorbed, and thus human skin is present. If the weighted difference is below the threshold, the output is low, indicating no human skin is present. This occurs when either first IR band does not reflect off the skin or the second IR band does not absorb it.

In the preferred embodiment, one illuminator is used to provide a band transmission that interacts with two detectors, one for each of the two IR bands. This illuminator would transmit a band, preferably, with a range between about 0.8 and about 2.2 µm, which, of course, covers both desired IR bands.

In an alternative embodiment, two illuminators are used, one at each desired IR band, and a single detector receives the bands in sequence, so that the same calculations can be done to indicate the presence or absence of skin. By having both a band that reflects on skin and a second band that is absorbed, use of other materials that do one but not the other are defeated.

BRIEF DESCRIPTION OF THE DRAWINGS

For a more complete understanding of the invention, reference is hereby made to the drawings, in which.

In the figures, like reference characters designate identical or corresponding components and units throughout the several views.

DETAILED DESCRIPTION OF THE PREFERRED EMBODIMENT

Figure 1:
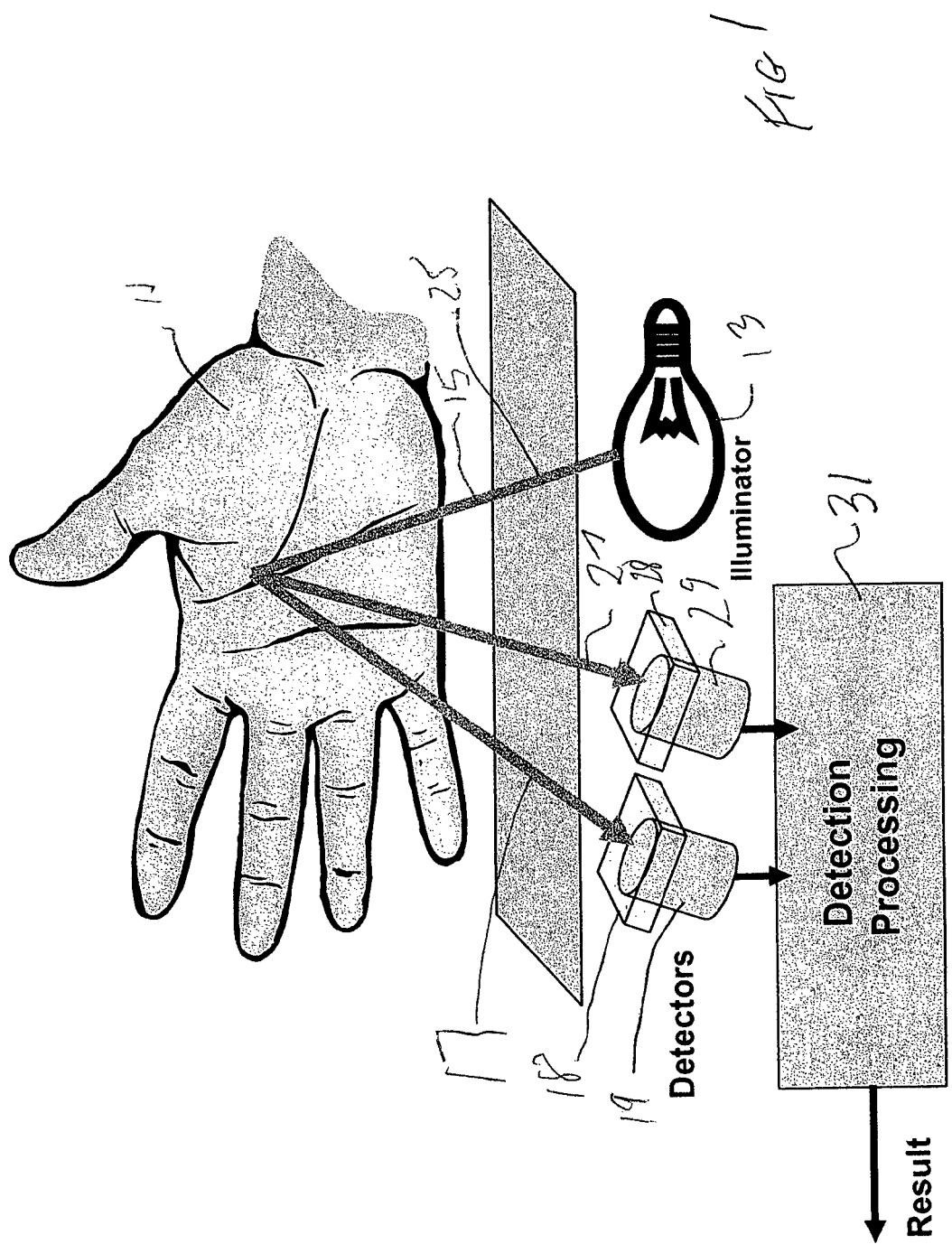
FIG. 1 is a schematic view of the preferred embodiment of the present invention.

The present invention operates as a sensor to detect the presence of skin, such as that of the human hand or other part of the anatomy that is exposed to detection. In the preferred embodiment, a hand 11, as shown in FIG. 1, is illuminated by illuminator 13, which transmits infrared radiation (IR) at various selected wavelengths. These wavelengths are transmitted on a path that strikes the skin of hand 11 and is reflected back to one or more IR detectors.

The first IR band 15 transmitted from illuminator 13 is in the band range that reflects from human skin, and preferably of about 0.8 to about 1.4 µm. It has been discovered that this band range reflects strongly from human skin 11 and follows the path 17 to detector 19. The second IR band 25 transmitted from illuminator 13 is in the band range that is absorbed by skin, and preferably of about 1.4 to about 2.2 µm. It has been discovered that this second band range is absorbed almost completely by human skin 11. The path 27 of the second IR band is received by detector 29. Detector 19 preferably includes filter 18 which passes only the band range of about 0.8 to about 1.4 μm and filters out other IR band wavelengths. Similarly, Detector 29 preferably includes filter 28, which passes only the band range of about 1.4 to about 2.2 μm and filters out other IR band wavelengths. Of course the illuminator can transmit a wider IR band than between these two preferred values of about 0.8 to about 1.4 μm.

A detection processing element 31, which may be a chip or other microelectronic device, performs a weighted difference and threshold of the outputs of detectors 19 and 29. If the weighted difference is above a set threshold, the device output voltage is pulled high, indicating human skin is present. In this situation, a large signal is generated by strong reflection of first IR band 15, while the signal generated by second IR band 25 is almost zero since this band has been absorbed by skin 11.

If the weighted difference is below the threshold, the output of the device 31 is pulled low, indicating no human skin is present. This occurs when either first IR band 15 does not reflect off the object it strikes, such as if a rubber or latex glove were worn over the skin and first detector will not receive a signal. Or, second IR band 25 does not absorb into the object it strikes, again as if something covered the human skin and second detector 29 will receive a lot of signal. Both are possible, and in any event, the sensor will indicate that something other than human skin has been sensed. The detector processing element 31 may also be configured to use negative logic, such that there may be a negative output for detection of skin and a high output for the absence of skin. In any form, detector processing element 31 signals a positive result for skin when the expected reflected band and the expected absorbed band are both present. Otherwise, a negative result is obtained because skin has not been detected.

Figure 2:
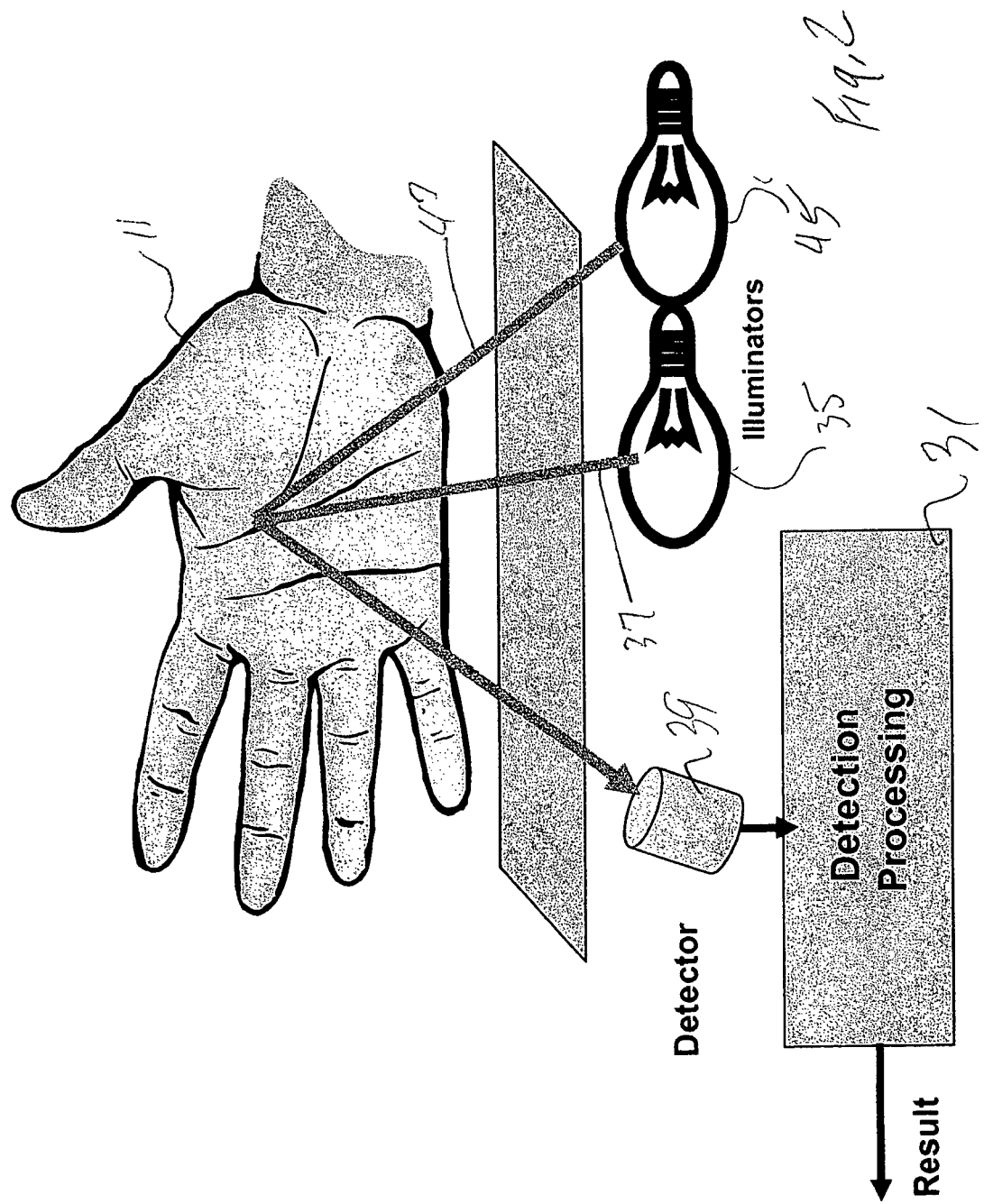
FIG. 2 is a schematic view of another embodiment of the present invention.

In FIG. 2, an alternative embodiment is shown. The hand 11 is presented for detection to verify that human skin is present. In this embodiment, a pair of IR illuminators 35 and 45 are directed to illuminate the skin 11 with a first IR band wave 37 that is in the range that reflects from human skin, such as the preferred range of about 0.8 to about 1.4 μm. The second IR band 47 transmitted from illuminator 45 is in the band range that is absorbed by skin, such as the preferred range of about 1.4 to about 2.2 μm. Both IR band waves 37 and 47 directed to detector 39, which detects the presence or absence of a reflected signal from band wave 37 and the absence or presence of an absorbed signal from band wave 47. Control electronics in detector processing unit 31 alternate power to IR illuminators 35 and 45, and would sample the output of detector 39 for each one sequentially. The control electronics in unit 31 would then perform the same weighted differences for the two samples as described above, and provide a pass/fail or other output. Detector processing unit 31 would be a microprocessor or microcontroller as desired. IR illuminators could be as focused as noted above with respect to the band width transmitted but they could also transmit other band ranges. For example, illuminator 35 could transmit lower frequencies and illuminator 45 could transmit higher frequencies without affecting the operation of the invention, but care should be taken so as to not transmit conflicting frequencies that the detector should not see during the other sequence of detection.

The present invention is admirably suited to improve many of the current biometric sensors currently in use or envisioned for use as a security device, access control or other use. Fingerprint sensors are able to compare a presented fingerprint against a data base, to allow or deny access to a controlled area or use of an electronic device such as a computer, cell phone, or other device, for example. But fingerprint sensors are not capable of distinguishing between a human finger presented for fingerprint screening and a rubber or plastic mold of the same finger. The present invention would verify the presence or absence of human skin, and thus make the fingerprint sensor much more reliable. Iris comparisons also can be defeated by the use of contact lenses in some cases. Again, the present invention would verify the presence of actual skin. In one use of the present invention, the biometric sensor would need to have a positive determination of the presence of human skin from the device of this invention before even processing the data it has been designed to detect.

While particular embodiments of the present invention have been illustrated and described, it is not intended to limit the invention, except as defined by the following claims.

The invention claimed is:

1. A device for detecting the presence of skin, comprising:
   an illuminator source for transmitting a first IR band and a second IR band, said first IR band being capable of being reflected from skin and said second IR band being capable of being absorbed by skin;
   a detector for detecting said first and second IR band after said first and second IR bands have contacted said skin and for providing a signal indicating a detection of each of said first and second IR bands; and
   a detector processing unit for processing said signal and indicating a presence of skin when both said first IR band is detected and said second IR band is not detected by said detector.

2. The device of claim 1, wherein said first IR band is about 0.8 to about 1.4 μm and said second IR band is about 1.4 to about 2.2 μm.

3. The device of claim 1, wherein said illuminator is adapted to transmit an IR band that includes at least both said first and second IR bands.

4. The device of claim 3, wherein said illuminator transmits an IR band of about 0.8 to about 2.2 μm.

5. The device of claim 3, wherein said detector comprises a first detector adapted to detect said first IR band and a second detector adapted to detect said second IR band.

6. The device of claim 5, wherein first detector further includes a first filter that passes only said first IR band and said second detector further includes a second filter that passes only said second IR band.

7. The device of claim 1, where said illuminator includes a first illuminator for transmitting said first IR band and a second illuminator for transmitting said second IR band.

8. The device of claim 7, wherein said first IR band is about 0.8 to about 1.4 μm and said second IR band is about 1.4 to about 2.2 μm.

9. The device of claim 7, wherein said detector comprises a detector adapted to detect both said first IR band and said second IR band and said detector processing unit is adapted to selectively energize said first and second illuminators in a predetermined sequence.

10. The device of claim 1, wherein said detector processing unit is adapted to provide said signal indicating a presence or absence of skin to a biometric sensor.

11. A device for detecting the presence of skin, comprising:
    illuminator source means for transmitting a first IR band and a second IR band, said first IR band being capable of being reflected from skin and said second IR band being capable of being absorbed by skin;
    detector means for detecting said first and second IR band after said first and second IR bands have contacted said skin and for providing a signal indicating a detection of each of said first and second IR bands; and detector processing unit means for processing said signal and indicating a presence of skin when both said first IR band is detected and said second IR band is not detected by said detector.

12. The device of claim 11, wherein said first IR band is about 0.8 to about 1.4 μm and said second IR band is about 1.4 to about 2.2 μm.

13. The device of claim 11, wherein said illuminator means is adapted to transmit an IR band that includes at least both said first and second IR bands.

14. The device of claim 13, wherein said illuminator means transmits an IR band of about 0.8 to about 2.2 μm.

15. The device of claim 13, wherein said detector means comprises a first detector means for detecting said first IR band and a second detector means for detecting said second IR band.

16. The device of claim 15, wherein first detector means further includes a first filter means for passing only said first IR band and said second detector means further includes a second filter means for passing only said second IR band.

17. The device of claim 11, where said illuminator means includes a first illuminator means for transmitting said first IR band and a second illuminator means for transmitting said second IR band.

18. The device of claim 17, wherein said first IR band is about 0.8 to about 1.4 μm and said second IR band is about 1.4 to about 2.2 μm.

19. The device of claim 17, wherein said detector means comprises a detector means for detecting both said first IR band and said second IR band and said detector processing unit means is adapted to selectively energize said first and second illuminator means in a predetermined sequence.

20. The device of claim 11, wherein said detector processing unit means is adapted to provide said signal indicating a presence or absence of skin to a biometric sensor.

* * * * *